United States Patent
Diorio (10) Patent No.: US 8,174,367 B1
(45) Date of Patent: *May 8, 2012

(54) CAUSING RFID TAGS TO BACKSCATTER MORE CODES

(75) Inventor: Christopher J. Diorio, Shoreline, WA (US)

(73) Assignee: Impinj, Inc., Seattle, WA (US)

(*) Notice: Subject to any disclaimer, the term of this patent is extended or adjusted under 35 U.S.C. 154(b) by 1021 days.

This patent is subject to a terminal disclaimer.

(21) Appl. No.: 12/112,832

(22) Filed: Apr. 30, 2008

Related U.S. Application Data (60) Provisional application No. 60/932,699, filed on May 31, 2007, provisional application No. 60/932,627, filed on May 31, 2007, provisional application No. 61/005,249, filed on Dec. 4, 2007.

(51) Int. Cl.
*H04Q 5/22* (2006.01)
*G08B 13/14* (2006.01)
*G06F 17/00* (2006.01)
*G06F 7/00* (2006.01)
*G06K 7/10* (2006.01)
*G06K 15/00* (2006.01)

(52) U.S. Cl. ............ 340/10.4; 340/10.1; 340/10.2; 340/10.3; 340/10.5; 340/572.2; 340/572.4; 340/572.7; 235/375; 235/376; 235/377; 235/378

(58) Field of Classification Search .............. None
See application file for complete search history.

(56) References Cited

U.S. PATENT DOCUMENTS

| | | | |
|---|---|---|---|
| 6,172,596 B1* | 1/2001 | Cesar et al. ............. | 340/10.41 |
| 7,009,913 B2* | 3/2006 | Yuzawa et al. .......... | 368/10 |
| 7,750,793 B2* | 7/2010 | Juels ....................... | 340/10.5 |
| 2004/0164148 A1* | 8/2004 | Qiu .......................... | 235/383 |
| 2006/0087407 A1* | 4/2006 | Stewart et al. .......... | 340/10.52 |
| 2006/0103535 A1* | 5/2006 | Pahlaven et al. ........ | 340/572.1 |
| 2006/0170565 A1* | 8/2006 | Husak et al. ............ | 340/825.49 |
| 2006/0187031 A1* | 8/2006 | Moretti et al. .......... | 340/539.22 |
| 2007/0096883 A1* | 5/2007 | Kim ......................... | 340/10.51 |
| 2007/0132585 A1* | 6/2007 | Llorca et al. ............ | 340/572.1 |
| 2007/0132588 A1* | 6/2007 | Jung et al. ............... | 340/572.1 |
| 2007/0194889 A1* | 8/2007 | Bailey et al. ............ | 340/10.51 |

OTHER PUBLICATIONS

Non-Final Office Action U.S. Appl. No. 12/112,699 mailed Jun. 29, 2011.

* cited by examiner

*Primary Examiner* — George Bugg
*Assistant Examiner* — Renee Dorsey
(74) *Attorney, Agent, or Firm* — Turk IP Law, LLC

(57) ABSTRACT

RFID reader systems, readers, components, software and methods for causing RFID tags to backscatter a combination made from at least portions of a first code and a second code stored in tag memory, without transmitting any commands in the interim. In a number of embodiments, therefore, a separate command does not have to be sent for also reading the second code, thereby saving time in inventorying the tags. Plus, the combination can enable reading tag codes during tag manufacturing that are not otherwise readily available to read in the field.

25 Claims, 10 Drawing Sheets

RFID SYSTEM

*RFID READER SYSTEM DETAIL*

FIG. 4

RFID READER SYSTEM CONFIGURATION WITH OPTIONAL LOCAL AND REMOTE COMPONENTS

FIG. 8      *RFID TAG COMPONENTS*

FIG. 9      *RFID TAG METHODS*

FIG. 10      *RFID READER SYSTEM COMPONENT METHODS*

FIG. 11

FIG. 12    *COMBINATION OF PORTIONS OF CODES*

FIG. 13    *COMBINATION OF PORTIONS OF CODES*

*TUNING OF DURATION OF INTERIM PAUSE*

FIG. 14

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

FIG. 15A

*TABLE 6.17 - SELECT COMMAND OF THE GEN2 SPEC VERSION 1.1.0*

| | | | | Mask | | | | |
|---|---|---|---|---|---|---|---|---|
| Membank | Pointer | Length | | | FEF | | FCF | |
| | | | Subfield_1 | ... | Subfield_N | Command code | Data |
| # of bits | 2 | EBV | 8 | Variable | ... | Variable | 5 | Variable |
| description | - | - | - | - | ... | - | - | - |

FIG. 15B

*SUBDIVIDING THE MASK FIELD*

| | | | | Mask | | | | |
|---|---|---|---|---|---|---|---|---|
| Membank | Pointer | Length | | FEF | | | FCF | |
| | | | Class ID | MDID | Indicator | Command code | Data |
| # of bits | 2 | EBV | 8 | 2 | 12 | 1 | 5 | Variable |
| description | 10 | 06h | 14 | 10 | 000000000001 | 1 | 00000 | - |

FIG. 15C

*EXAMPLE*

CAUSING RFID TAGS TO BACKSCATTER MORE CODES

CROSS REFERENCE TO RELATED APPLICATIONS

This application claims priority from U.S. Provisional Application Ser. No. 60/932,699, filed on May 31, 2007, the disclosure of which is hereby incorporated by reference for all purposes.

This application claims priority from U.S. Provisional Application Ser. No. 60/932,627, filed on May 31, 2007, the disclosure of which is hereby incorporated by reference for all purposes.

This application claims priority from U.S. Provisional Application Ser. No. 61/005,249, filed on Dec. 4, 2007, the disclosure of which is hereby incorporated by reference for all purposes.

This application may be found to have aspects in common with commonly assigned U.S. non-provisional patent application Ser. No. 12/112,699, entitled "RFID TAG CHIPS AND TAGS CAPABLE OF BACKSCATTERING MORE CODES AND METHODS", and filed on the same day as the instant application by the same inventor.

FIELD OF THE INVENTION

The present description addresses the field of Radio Frequency IDentification (RFID) systems, and more specifically to causing such systems to yield their data more expeditiously.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, data can be learned about the associated item that hosts the tag, and/or about the tag itself.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

A well-known problem in RFID systems is expedience in reading the tags, especially where it is desired to read more than one of the codes stored in each tag. The problem becomes exacerbated if there are many tags, or the host items are moving and thus allow only limited time to read their tags.

BRIEF SUMMARY

The invention improves over the prior art.

Briefly, the present invention provides RFID tags and chips for RFID tags that store a first code and a second code in memory. Moreover, the tags and chips for tags are capable of backscattering a combination of at least portions of the first code and the second code, without receiving any commands in the interim. The present invention also provides RFID reader systems, readers, components, software and methods for causing RFID tags to backscatter the combination, without transmitting any commands in the interim.

In a number of embodiments, separate reader commands do not have to be sent for reading the first and the second codes. Not sending separate commands can save time in inventorying the tags. Plus, it can enable reading of tag codes during tag manufacturing that are not otherwise readily available to read in the field.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which.

DETAILED DESCRIPTION

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

Figure 1:
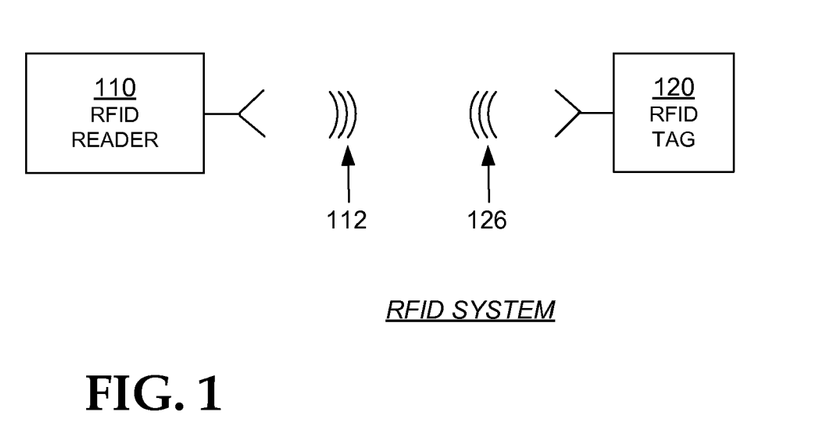
FIG. 1 is a block diagram of components of an RFID system.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
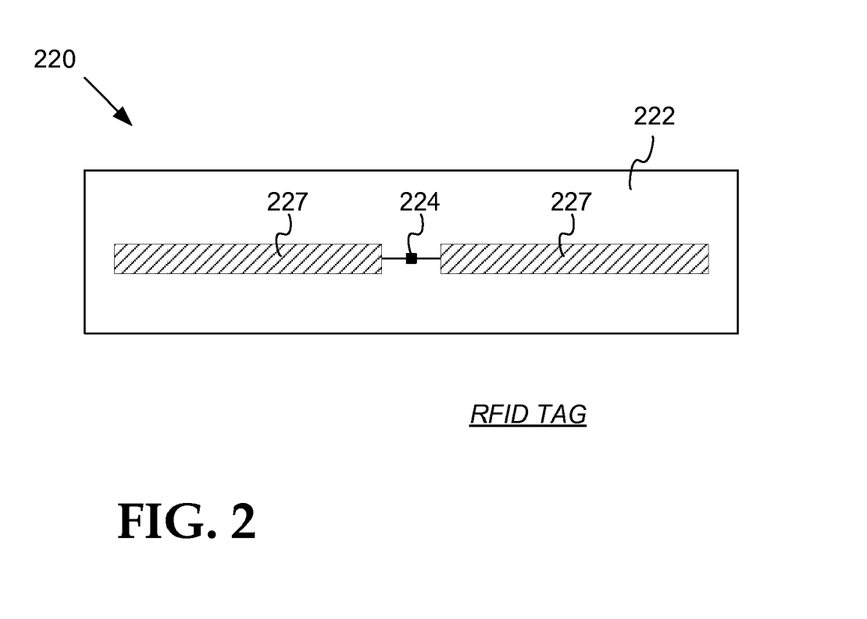
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
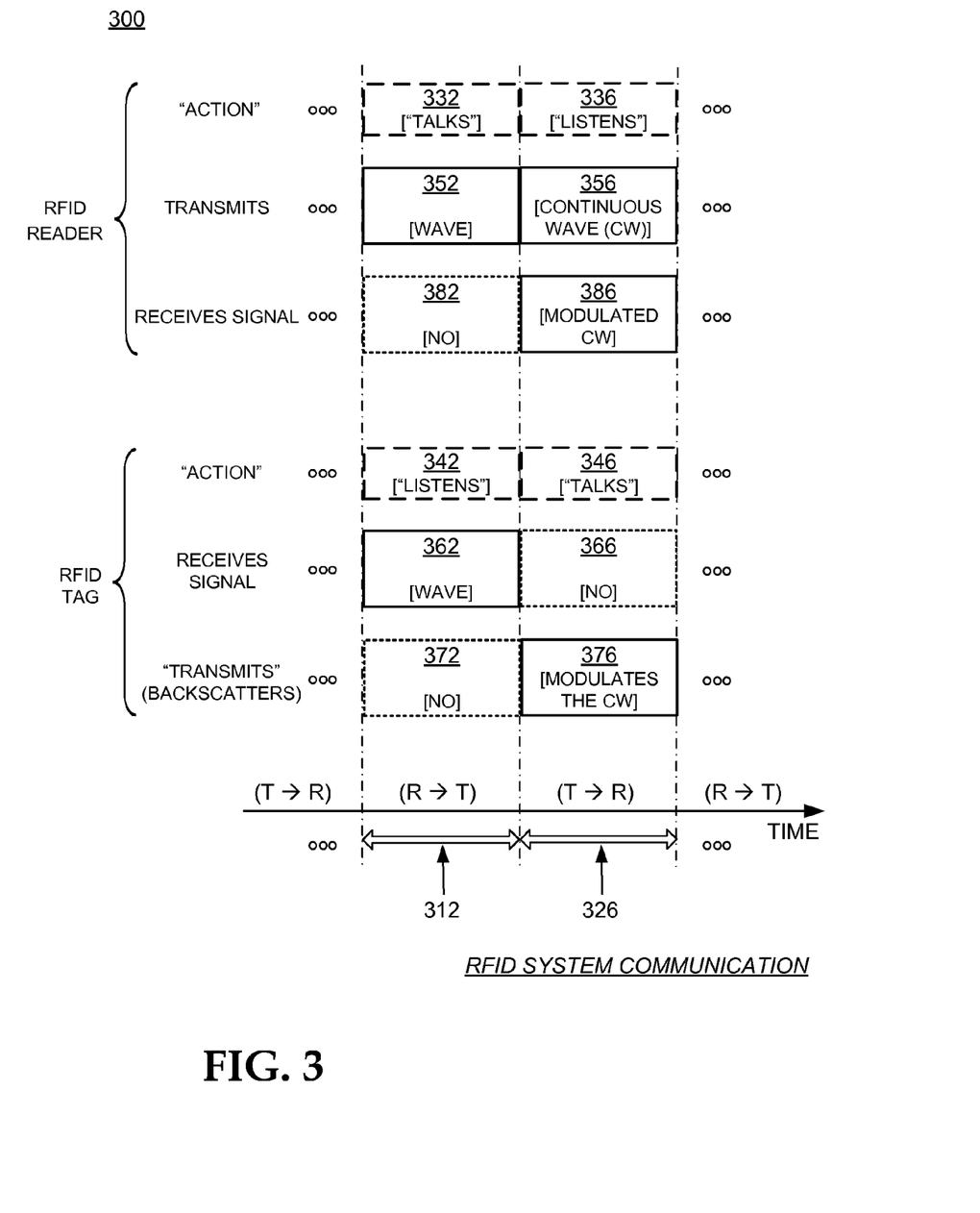
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal. Version 1.1.0 of the Gen2 Spec is hereby incorporated by reference in its entirety.

In addition, a protocol can be a variant of a stated specification such as the Gen2 Spec, for example including fewer or additional commands than the stated specification calls for, and so on. In such instances, additional commands are sometimes called custom commands.

Figure 4:
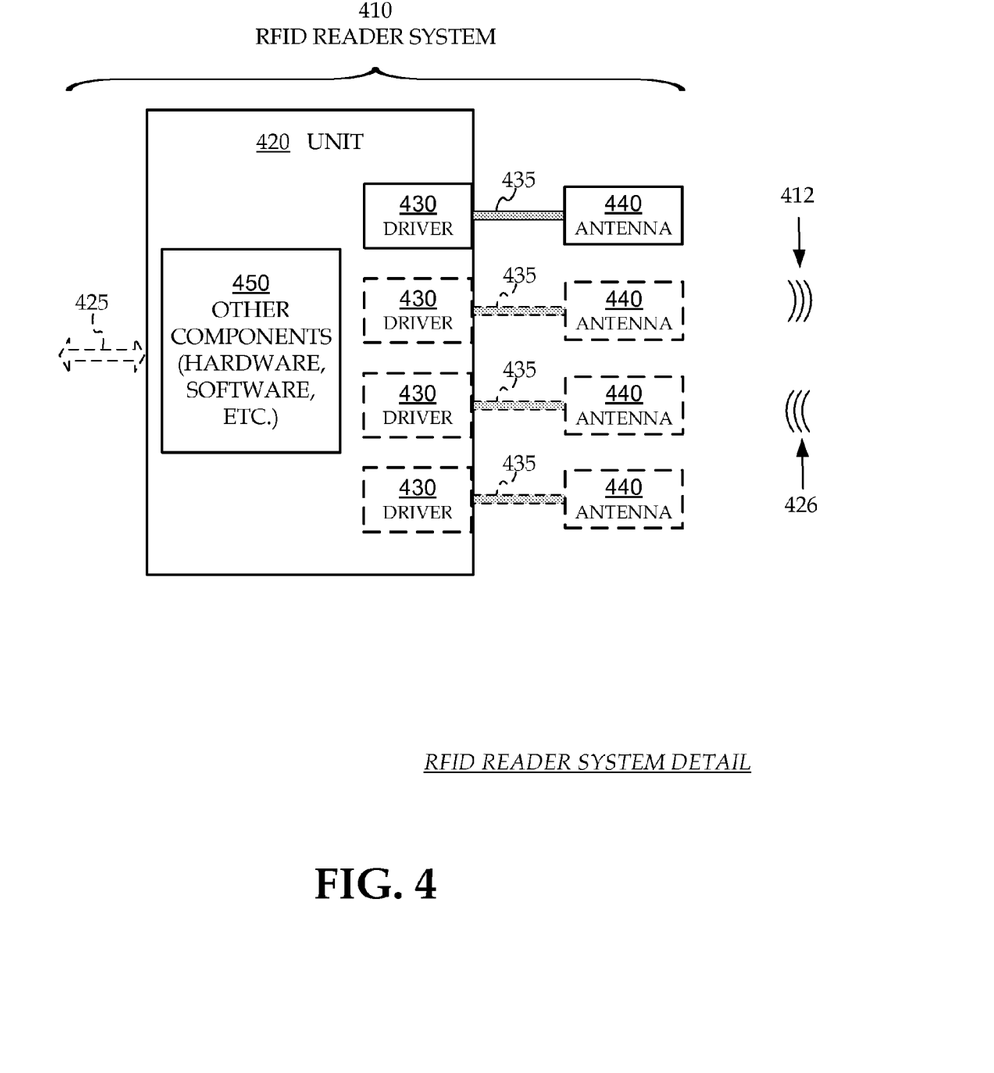
FIG. 4 is a block diagram showing a detail of an RFID reader system, such as the one shown in FIG. 1.

FIG. 4 is a block diagram showing a detail of an RFID reader system 410, which can be the same as reader 110 shown in FIG. 1. A unit 420 is also known as a box 420, and has one or more antenna drivers 430. In some embodiments it has four drivers 430. For each driver 430 there is an output connector. The output connector is typically for a coaxial cable. Accordingly, connectors 435 can be attached to the outputs of the provided respective drivers 430, and then connectors 435 can be attached to respective antennas 440.

A driver 430 can send to its respective antenna 440 a driving signal that is in the RF range, which is why connector 435 is typically but not necessarily a coaxial cable. The driving signal causes the antenna 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 is received by an antenna 440 and ultimately becomes a signal sensed by unit 420.

Unit 420 also has other components 450, such as hardware and/or software and/or firmware, which may be described in more detail later in this document. Components 450 control drivers 430, and as such cause RF wave 412 to be transmitted, and the sensed backscattered RF wave 426 to be interpreted. Optionally and preferably there is a communication link 425 to other equipment, such as computers and the like, for remote operation of system 410.

Figure 5:
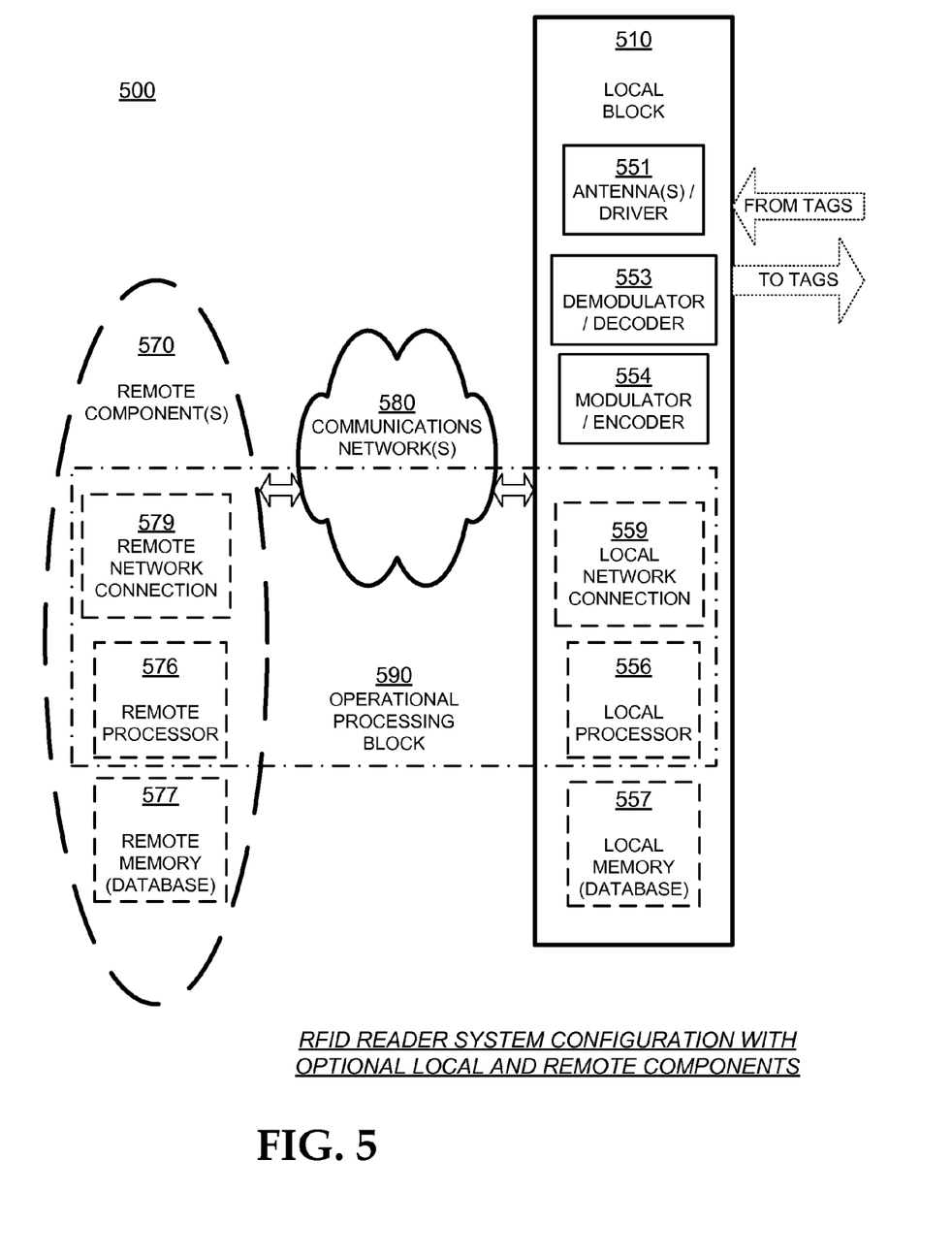
FIG. 5 is a block diagram of a whole RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 can be unit 420 of FIG. 4.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, or a mere local communication link, such as a USB, PCI, and so on. In turn, local block 510 then includes a local network connection 559 for communicating with network 580.

There can be one or more remote component(s) 570. If more than one, they can be located at the same location, or in different locations. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 6:
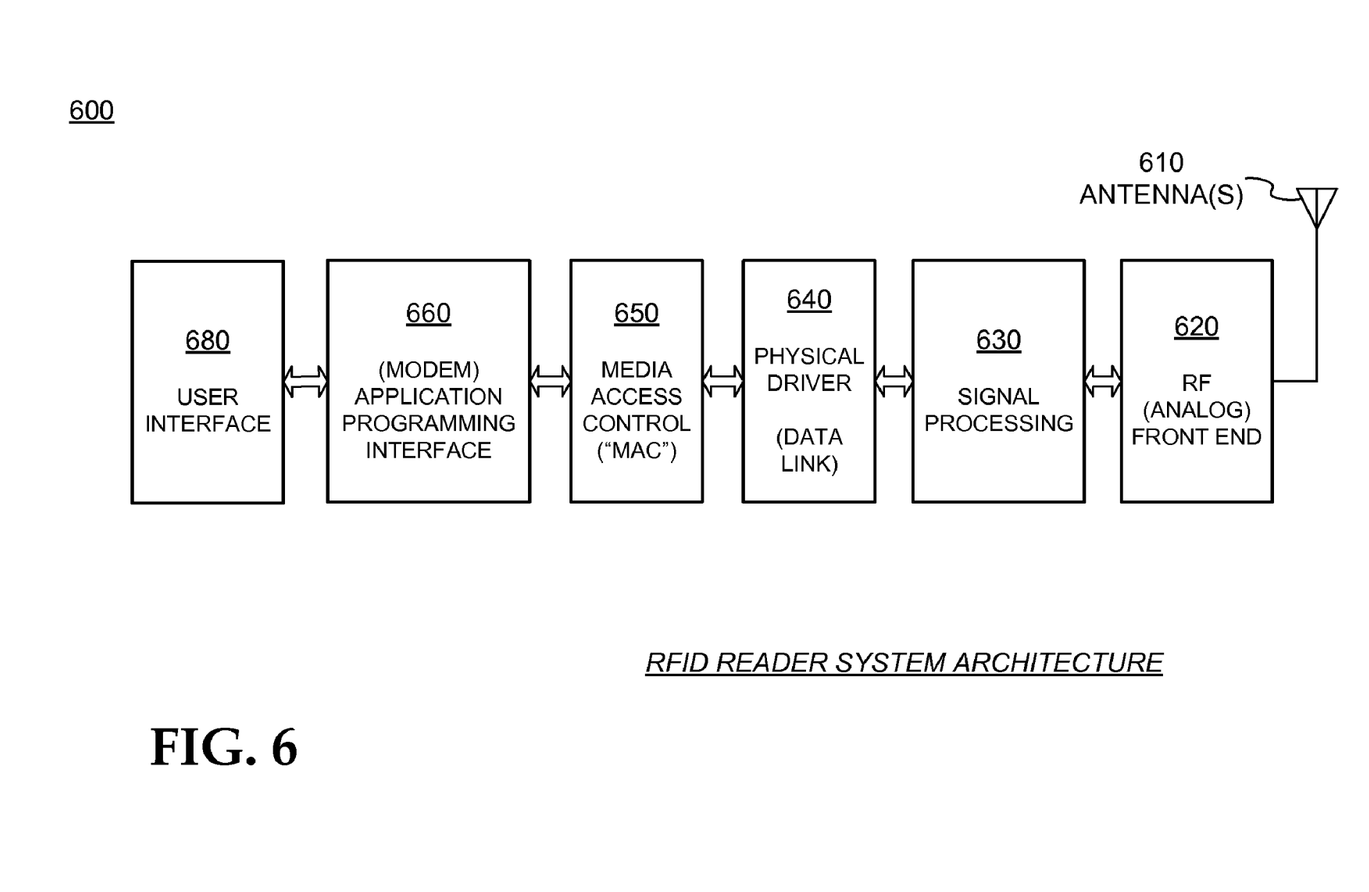
FIG. 6 is a block diagram illustrating an overall architecture of an RFID reader system according to embodiments.

FIG. 6 is a block diagram illustrating an overall architecture of an RFID reader system 600 according to embodiments. It will be appreciated that system 600 is considered subdivided into modules or components. Each of these modules may be implemented by itself, or in combination with others. It will be recognized that some aspects are parallel with those of FIG. 7. In addition, some of them may be present more than once.

RFID reader system 600 includes one or more antennas 610, and an RF Front End 620, for interfacing with antenna(s) 610. These can be made as described above. In addition, Front End 620 typically includes analog components.

System 600 also includes a Signal Processing module 630. In this embodiment, module 630 exchanges waveforms with Front End 620, such as I and Q waveform pairs. In some embodiments, signal processing module 630 is implemented by itself in an FPGA.

System 600 also includes a Physical Driver module 640, which is also known as Data Link. In this embodiment, module 640 exchanges bits with module 630. Data Link 640 can be the stage associated with framing of data. In one embodiment, module 640 is implemented by a Digital Signal Processor.

System 600 additionally includes a Media Access Control module 650, which is also known as MAC layer. In this embodiment, module 650 exchanges packets of bits with module 640. MAC layer 650 can be the stage for making decisions for sharing the medium of wireless communication, which in this case is the air interface. Sharing can be between reader system 600 and tags, or between system 600 with another reader, or between tags, or a combination. In one embodiment, module 650 is implemented by a Digital Signal Processor.

System 600 moreover includes an Application Programming Interface module 660, which is also known as API, Modem API, and MAPI. In some embodiments, module 660 is itself an interface for a user.

All of these functionalities can be supported by one or more processors. One of these processors can be considered a host processor. Such a processor would, for example, exchange signals with MAC layer 650 via module 660. In some embodiments, the processor can include applications for system 600. In some embodiments, the processor is not considered as a separate module, but one that includes some of the above-mentioned modules of system 600.

A user interface 680 may be coupled to API 660. User interface 680 can be manual, automatic, or both. It can be supported by a separate processor than the above mentioned processor, or implemented on it.

It will be observed that the modules of system 600 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 610 as signals, which are in turn processed successively by the various modules in the chain. Processing can terminate in any one of the modules. In a transmitting mode, initiation can be in any one of these modules. Ultimately, signals are routed internally, for antenna(s) 610 to transmit as wireless waves.

The architecture of system 600 is presented for purposes of explanation, and not of limitation. Its particular subdivision into modules need not be followed for creating embodiments according to the invention. Furthermore, the features of the invention can be performed either within a single one of the modules, or by a combination of them.

At this juncture, a prior art method of reading tag data is described.

Figure 7:
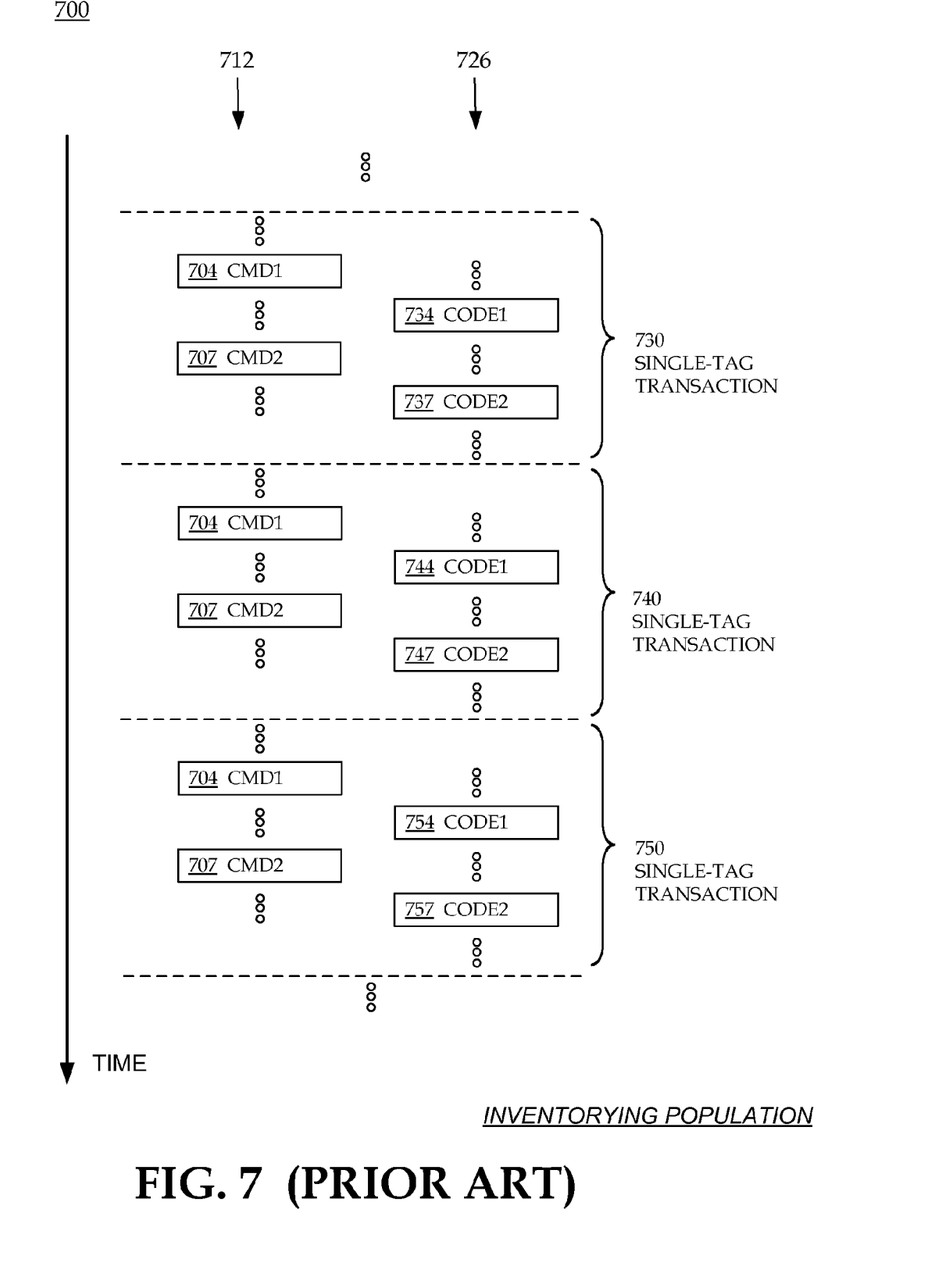
FIG. 7 is a timing diagram showing conventional commands from an RFID reader and replies from a population of RFID tags for reading first and second codes of the tags.

FIG. 7 is a timing diagram 700 showing conventional commands by an RFID reader, and replies by a population of RFID tags, for reading codes of the tags. Neither the reader nor the tags are shown in diagram 700. Timing diagram 700 proceeds downward along a vertical axis TIME, with commands 712 transmitted by the reader alternating with replies 726 backscattered by the tags.

In timing diagram 700, the reader singulates each tag successively, such that only one tag replies at a time, while the other tags are silent. While each tag is thus singulated, the reader reads its data by having a so-called transaction with the tag. Three transactions 730, 740, 750 are described as an example only, while tens, or hundreds, or thousands of such transactions can take place. In addition, each of transactions 730, 740, 750 is not necessarily described in full, but only some pertinent commands are given. Not shown are commands, for example, to singulate each tag for its transaction.

Each of transactions 730, 740, 750 is designed so as to read the desired information from the tags. In timing diagram 700, a first code and a second code, stored in memories of the tags, are read out, as follows. In first transaction 730 with one tag, a first command CMD1 704 elicits a first code CODE1 734 from the tag. Then a second command CMD2 707 elicits a second code CODE2 737 from the tag. Then, in transaction 740 with another tag, first command CMD1 704 is repeated, and elicits a first code CODE1 744 from the other tag. Then second command CMD2 707 is repeated, and elicits a second code CODE2 747 from the other tag. Then, in transaction 750 with an additional tag, first command CMD1 704 is repeated, and elicits a first code CODE1 754 from the additional tag. Then second command CMD2 707 is repeated, and elicits a second code CODE2 757 from the additional tag.

The first code and the second code can be any suitable codes. For example, the first code can be an Electronic Product Code (EPC) of the tag, associated with a host item to which the tag is attached. The second code can be a TID code of the tag, which complies with the Gen2 Spec. Or, the second code can be any one or more of: a date of expiration of the tag's host item, a date by which the host item is to be sold by, a date at which the host item was sold, a code for a sale of the host item, a receipt of the sale, an identifier for a retailer that made the sale, an identifier for a store through which the sale is made, and so on. The second code could also alternately be an identifier for the tag, a password for the tag, an indicator for how a memory of the first tag is configured, and so on. Other codes can equivalently be used for the first and the second codes. In addition, what is called first and second codes can be interchanged, and so on.

As can be seen, each command takes time, each reply takes time, and there can be many transactions. And the time to read the tags can be constrained if the host items are moving. The invention addresses this timeliness problem.

Figure 8:
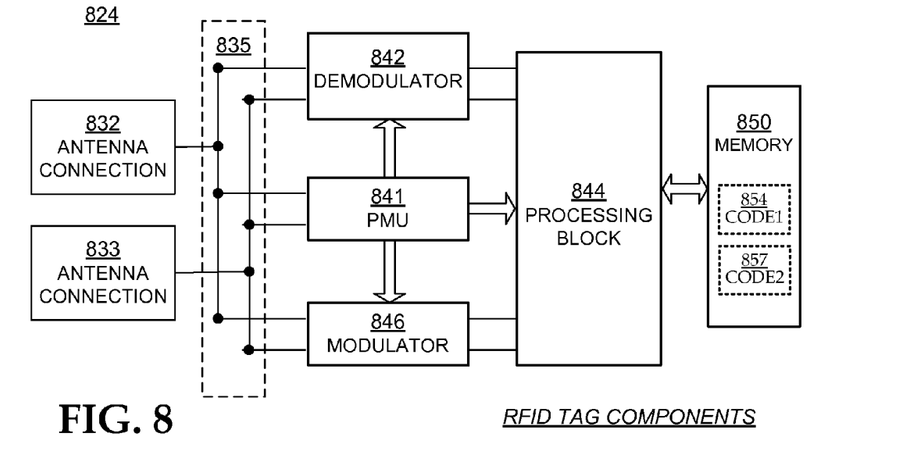
FIG. 8 is a block diagram of an implementation of an electrical circuit formed in an IC of the tag of FIG. 2.

FIG. 8 is a block diagram of an electrical circuit 824 according to embodiments. Circuit 824 may be formed in an IC of an RFID tag, such as IC 224 of FIG. 2. Circuit 824 has a number of main components that are described in this document. Circuit 824 may have a number of additional components from what is shown and described, or different components, depending on the exact implementation.

Circuit 824 includes at least two antenna connections 832, 833, which are suitable for coupling to one or more antenna segments (not shown in FIG. 8). Antenna connections 832, 833 may be made in any suitable way, such as using pads and so on. In a number of embodiments more than two antenna connections are used, especially in embodiments where more antenna segments are used.

Circuit 824 includes a section 835. Section 835 may be implemented as shown, for example as a group of nodes for proper routing of signals. In some embodiments, section 835 may be implemented otherwise, for example to include a receive/transmit switch that can route a signal, and so on.

Circuit 824 also includes a Power Management Unit (PMU) 841. PMU 841 may be implemented in any way known in the art, for harvesting raw RF power received via antenna connections 832, 833. In some embodiments, PMU 841 includes at least one rectifier, and so on.

In operation, an RF wave received via antenna connections 832, 833 is received by PMU 841, which in turn generates power for components of circuit 824. This is true for either or both reader-to-tag (R→T) and tag-to-reader (T→R) sessions, whether or not the received RF wave is modulated.

Circuit 824 additionally includes a demodulator 842. Demodulator 842 demodulates an RF signal received via antenna connections 832, 833. Demodulator 842 may be implemented in any way known in the art, for example including an attenuator stage, an amplifier stage, and so on.

Circuit 824 further includes a processing block 844. Processing block 844 receives the demodulated signal from demodulator 842, and may perform operations. In addition, it may generate an output signal for transmission.

Processing block 844 may be implemented in any way known in the art. For example, processing block 844 may include a number of components, such as a processor, memory, a decoder, an encoder, and so on.

Circuit 824 additionally includes a modulator 846. Modulator 846 modulates an output signal generated by processing block 844. The modulated signal is transmitted by driving antenna connections 832, 833, and therefore driving the load presented by the coupled antenna segment or segments. Modulator 846 may be implemented in any way known in the art, for example including a driver stage, amplifier stage, and so on.

In one embodiment, demodulator 842 and modulator 846 may be combined in a single transceiver circuit. In another embodiment, modulator 846 may include a backscatter transmitter or an active transmitter. In yet other embodiments, demodulator 842 and modulator 846 are part of processing block 844.

Circuit 824 additionally includes a memory 850, which stores data. Memory 850 is preferably implemented as a Nonvolatile Memory (NVM), which means that the stored data is retained even when circuit 824 does not have power, as is frequently the case for a passive RFID tag. The data stored in memory 850 can be a first code 854 and a second code 857 as per the above.

Processing block 844 is able to cause first code 854 to be backscattered, if command CMD1 704 is received. In some embodiments, processing block 844 is further able to cause second code 857 to be backscattered responsive to command CMD2 707. In other embodiments, second code 857 cannot be caused to be backscattered explicitly. These embodiments depend on the nature of second code 857. For example, some tags could be programmed to provide sale information responsive to a command, while not providing a password responsive to any command.

To improve over the process of FIG. 7, processing block 844 is additionally able to receive a third command, and in response cause to be backscattered a combination made from at least portions of the first code and the second code. This combination can be backscattered without receiving any commands in the interim, while the combination is being backscattered. There are many possibilities for the third command, and for the combination, which are described later in this document.

The invention also includes methods. An economy is achieved in the present document in that a single description is sometimes given for both methods according to embodiments, and functionalities of devices made according to embodiments. Plus, a single set of flowcharts is sometimes used to describe methods in and of themselves, along with operations of hardware and/or software and/or firmware where applicable. This is regardless of how each element is implemented.

Some methods of the invention are for the operation of RFID tags, and of chips that are intended for use with RFID tags, whether IC chips, or made from organic semiconductors, etc. These methods can be implemented in any number of ways, including the structures described in this document. Examples are now given.

Figure 9:
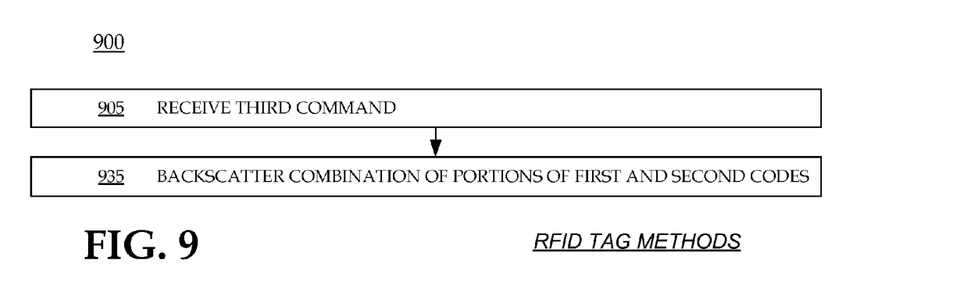
FIG. 9 is a flowchart illustrating methods for a tag according to embodiments.

FIG. 9 is flowchart 900 illustrating tag methods according to embodiments. At operation 905, a third command is received. At next operation 935, responsive to the third command being received, a combination is backscattered. No commands are received in the interim, while the combination is being backscattered. The combination is made from at least a portion of the first code, and at least a portion of the second code.

Other methods of the invention are for an operation or controlling an operation of an RFID reader, or an RFID reader system, or an RFID reader system component, or for related software. These methods can be implemented in any number of ways, including the structures described in this document. In addition, individual operations of such methods may be practiced by different readers, at different phases of the lifetime of an RFID tag, with or without interruptions between them, and so on. Examples are now given.

Figure 10:
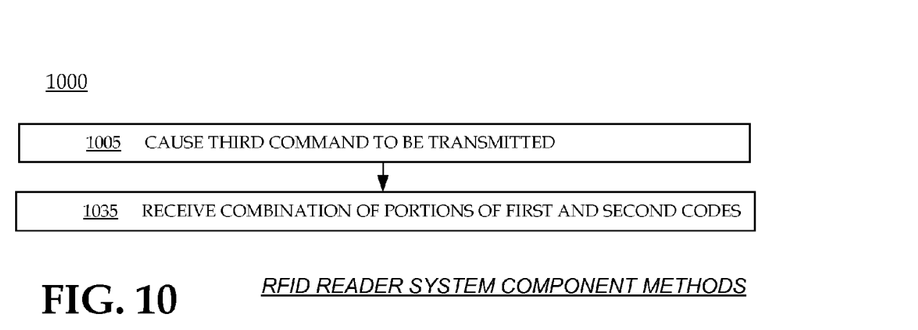
FIG. 10 is a flowchart illustrating methods for an RFID reader system component according to embodiments.

FIG. 10 is flowchart 1000 illustrating methods according to embodiments for operating or controlling an operation of an RFID reader, or an RFID reader system, or an RFID reader system component, or for related software. At operation 1005, a third command is caused to be transmitted to a tag. It will be recognized that this third command may be received by a tag at operation 905 described above.

At next operation 1035, responsive to causing the third command to be transmitted, there is received backscattered from the first tag a combination. No commands are caused to be transmitted in the interim, while the combination is being backscattered. The combination is made from at least a portion of the first code, and at least a portion of the second code. It will be recognized that this combination can be what is backscattered by the tag at operation 935 described above.

In a number of embodiments, therefore, a separate command does not have to be sent for reading also the second code, after the first code is read. This can save time in inventorying tags. An example is now described, which is best understood by contrasting with the earlier described FIG. 7.

Figure 11:
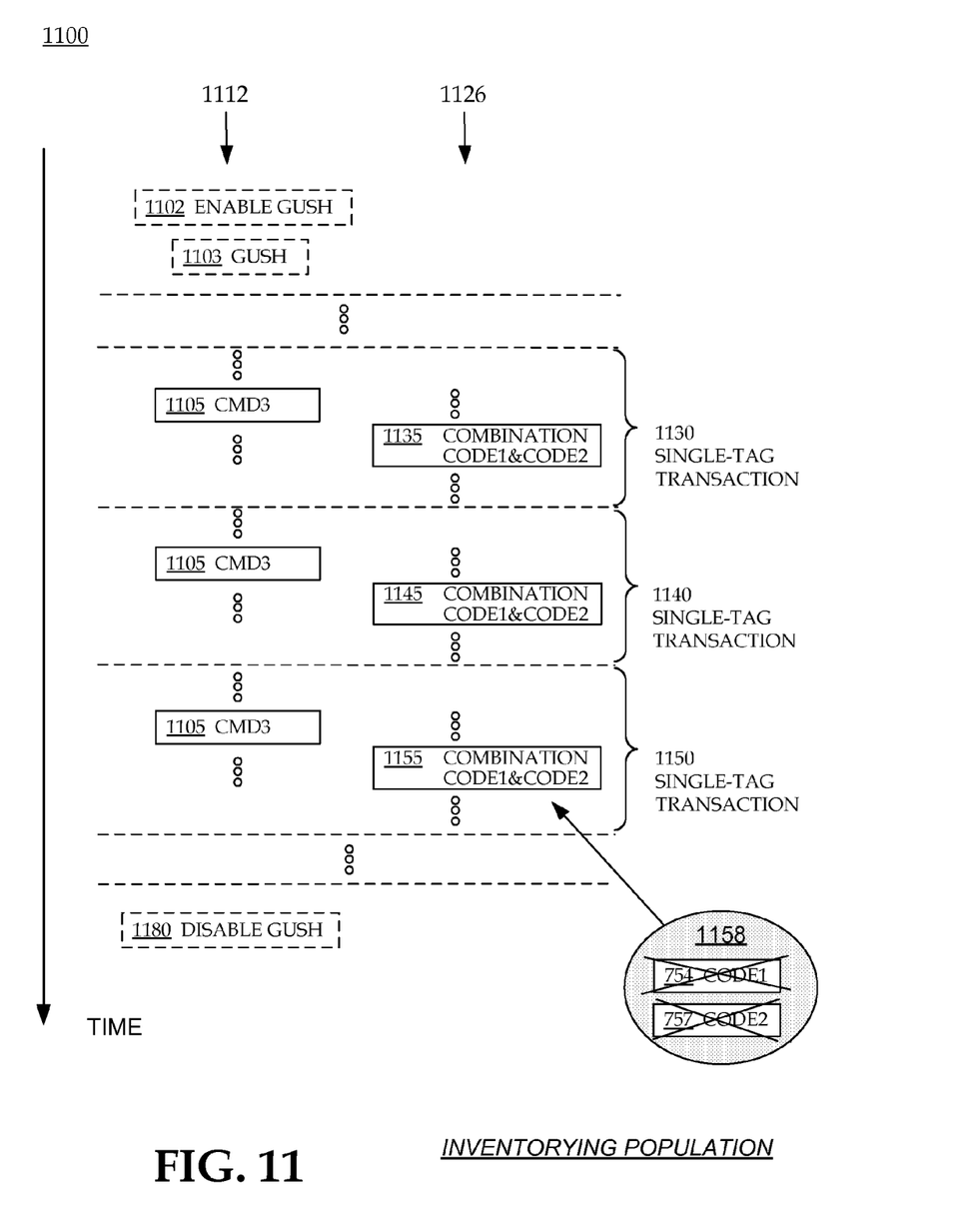
FIG. 11 is a timing diagram showing commands from an RFID reader and replies from a population of RFID tags for reading combinations of the first and the second codes of the tags according to embodiments.

FIG. 11 is a timing diagram 1100 showing commands by an RFID reader and replies by a population of RFID tags according to embodiments. Neither the reader nor the tags are shown in diagram 1100. The tags store the first code and the second code, as shown in FIG. 8. The commands in diagram 1100 result in replies with combinations of the first and of the second codes, according to embodiments.

Timing diagram 1100 proceeds downward along a vertical axis TIME, with commands 1112 transmitted by the reader alternating with replies 1126 backscattered by the tags. In the example of diagram 1100, the reader singulates each tag successively, such that only one tag replies at a time, while the other tags are silent. While each tag is thus singulated, the reader reads its data by having a transaction with the tag. Three transactions 1130, 1140, 1150 are described as an example only, while many more such transactions can take place. In addition, each of transactions 1130, 1140, 1150 is not necessarily described in full, but only some pertinent commands are given. Not shown are commands, for example, to singulate each tag for its transaction.

In first transaction 1130 with one tag, a third command CMD3 1105 elicits a combination 1135 of the tag. Combination 1135, as per the above, includes at least a portion of the first code and the second code stored in the tag memory. Then, in transaction 1140 with another tag, third command CMD3 1105 is repeated, and elicits a combination 1145 of the other tag. Then, in transaction 1150 with an additional tag, third command CMD3 1105 is repeated, and elicits a combination 1155 of the additional tag.

As can be seen by comparing to FIG. 7, transactions 1130, 1140, 1150 can take less time than respective transactions 730, 740, 750. In the embodiment of diagram 1100, according to a comment 1158, first code CODE1 754 and second code CODE2 757 were not backscattered in different installments, and with an intervening command 707 in the interim, as they were in corresponding transaction 750 of FIG. 7.

The nature of the third command is now described in more detail. In some embodiments, the third command is different from the first command. In other embodiments, the third command is identical to the first command, which can be convenient from the design point of view.

In some of embodiments, the tags backscatter the combination whenever they get the third command. In others, the tags have a Gush mode, above and beyond what is specified in the applicable communication protocol. While in the Gush mode, the tags backscatter the combination if they receive the third command, which can be different, or even the same as the first command.

In some embodiments, the tags enter the Gush mode by a series of custom steps. In other embodiments, the tags enter the Gush mode by receiving a custom Gush command, in connection with the third command. In that case, the combination is backscattered responsive to receiving the custom Gush command and the third command. An example is shown in FIG. 11, where optional Gush command 1103 is transmitted, and prior to the optional singulation.

In some embodiments, the tags are always capable of the Gush mode. In other embodiments, the Gush mode can operate only after it is enabled, and/or no longer operate after it is disabled. This can be accomplished in any number of ways. One such way is by additional commands. For example, in FIG. 11, a custom Enable Gush command 1102 precedes the Gush command 1103, and a custom Disable Gush command 1180 follows receipt of all combinations 1135, 1145, and 1155.

This feature can also be useful in testing the programming of tags produced in large numbers. In those cases, the second code can be of the type that is not made otherwise readily available to users. The combination can include, for example, a programmed EPC along with a passwords or the like, for confirmation of programming. Plus, the feature can be disabled, for shipping the confirmed tag in the field, for use by others.

The backscattered combination is now described in more detail. The combination is a code that is made from at least a portion of the first code, and a portion of the second code. Accordingly, the combination can include the first code, in whole or in part, scrambled or not scrambled. By "scrambled", it is meant with its bits interchanged, or encoded according to some key. Additionally, the combination can include the second code, in whole or in part, with its bits scrambled or not scrambled. Plus, the included bits of the first code can be intermingled with those of the second, or not. Moreover, a single error-correcting code can be generated for the combination, for checking the accuracy of the received backscatter.

In some embodiments, the combination is always formed by the tag in the same way from the bits of the first code and the second code. In other embodiments, the combination can be formed in different ways. In some of those, the combination is further configured responsive to the custom Gush command.

In a number of embodiments, the combination includes the first code or its portion, and the second code or its portion, with their bits not intermingled or scrambled. The first code or its portion can be before or after the second code or its portion. Examples are now described.

Figure 12:
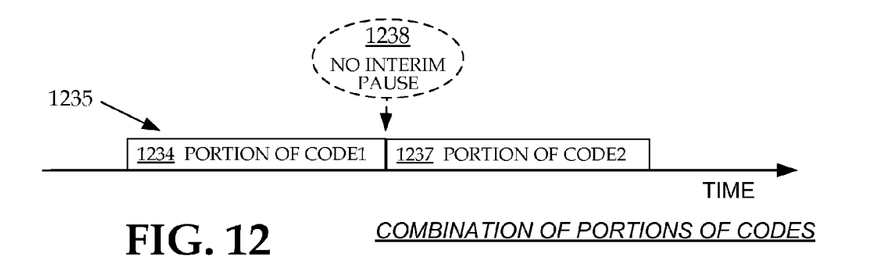
FIG. 12 is a diagram illustrating an embodiment where a combination of FIG. 11 is made from at least a portion of the first code followed by at least a portion of the second code, without an interim pause between them.

FIG. 12 is a diagram illustrating an embodiment of a combination 1235 along a TIME axis. At least a portion 1234 of the first code is followed by at least a portion 1237 of the second code. According to a comment 1238, there is no interim pause between portion 1234 and portion 1237. In other words, portion 1234 occurs contiguously with portion 1237 in combination 1235.

Figure 13:
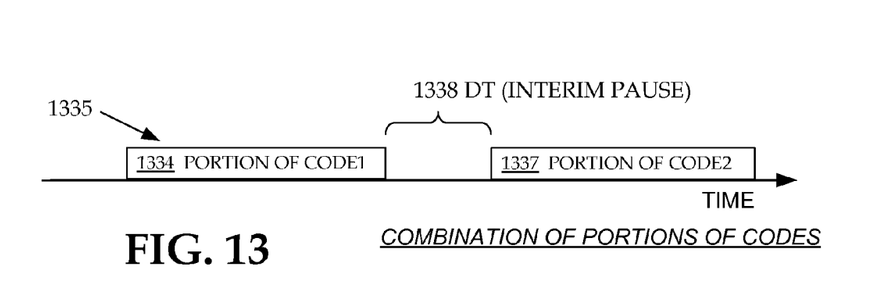
FIG. 13 is a diagram illustrating an embodiment where a combination of FIG. 11 is made from at least a portion of the first code followed by at least a portion of the second code, but with an interim pause between them.

FIG. 13 is a diagram illustrating an embodiment of a combination 1335 along a TIME axis. At least a portion 1334 of the first code is followed by at least a portion 1337 of the second code. In combination 1335 there is an interim pause 1338 between portions 1334 and 1337, which has a non-zero duration DT.

In some embodiments, duration DT has a given value. In other embodiments, it can be tuned.

Figure 14:
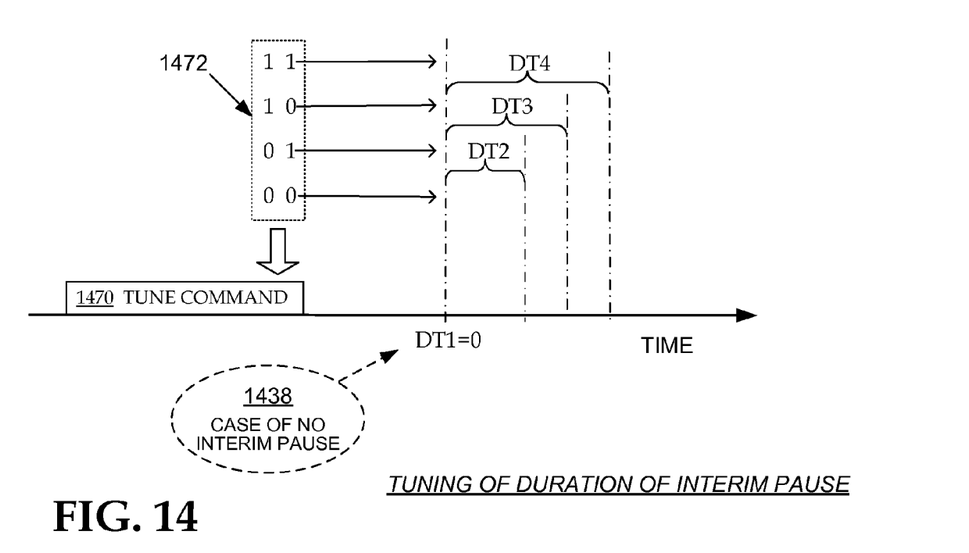
FIG. 14 is a conceptual diagram for illustrating how an amount of the interim pause of the embodiment of FIG. 13 can be further tuned according to embodiments.

FIG. 14 is a conceptual diagram for illustrating how a duration DT of the interim pause can be further tuned according to embodiments. A Tune command 1470 is caused to be transmitted by the reader, and received by the tag. Tune command 1470 can be any convenient command, such as the third command, the Gush command, the Enable Gush command, the Disable Gush command, or other command in the communication. Tune command 1470 encodes a duration value. The duration DT can thus determined from the duration value.

In the example of FIG. 14, the duration value is a two-bit field code 1472. Here the duration value is shown with the possible values it can take. Each value results in a different duration DT, namely one of DT1, DT2, DT3, DT4. The duration DT can be expressed in number of clock cycles, in a number of RF cycles, or in other units of time convenient for this purpose. Thus, duration DT can have values chosen among the values of 0, 4 msec, 8 msec, and 12 msec. In addition, such a delay should not be too long, because then other communication may start taking place. According to comment 1438, where DT1=0, that is the case of no interim pause.

The above-mentioned commands can be constructed in accordance with the applicable communication protocol. Moreover, custom commands can be used for the third command, and those of the Gush command, the Enable Gush command, the Disable Gush command and the Tune command. These custom commands can be constructed in any number of ways. In some instances, they can be considered as custom commands not being specified in a particular communication protocol. In some instances they would be standalone commands, made by a sequence of bits chosen so that they do not conflict with other commands of the protocol. In other instances, they can be commands with a custom payload. Such commands can be known to the protocol or not, and the payload can be used to distinguish among different custom commands, and optionally further transfer a parameter for the commands.

When commands are used that are known to the protocol, a section of their payload can be advantageously used for the purpose of implementing one of the custom commands. Such a section in the payload can be a mask field, according to embodiments. For the Gen2 Spec, two such commands are the Select command and the BlockWrite command. Between these two candidate commands, it should be considered that the Select command can be transmitted before or after a tag is singulated out of its population, while the BlockWrite is better suited for singulated tags. In addition, the BlockWrite command is optional to the Gen2 Spec, and the tag would probably have to have a controller that can accept it.

Each one of the custom commands can thus be constructed as an implementation of this Select command or the Block- Write command. An example is now described in terms of the Select command, but would apply equally to the BlockWrite command.

Figure 15A:
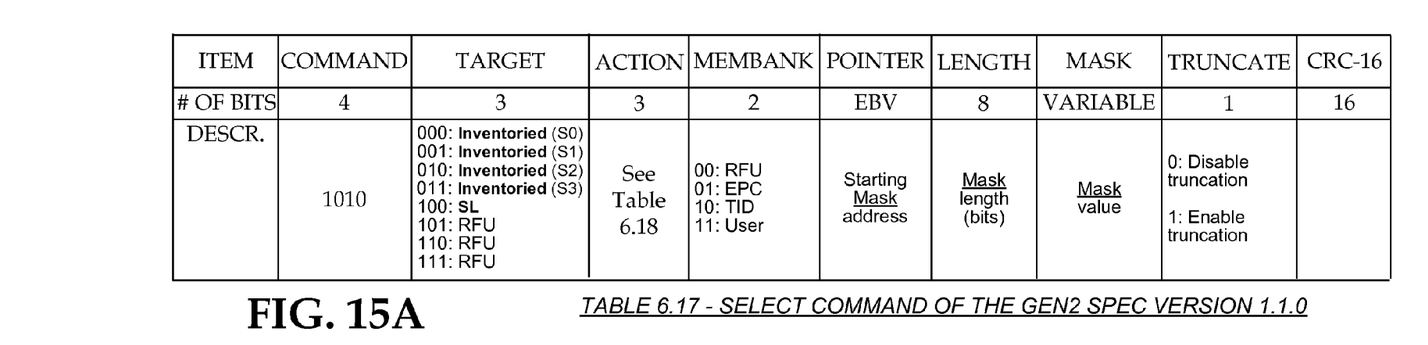
FIG. 15A is a table illustrating the fields of the Select command of the Gen2 Spec version 1.1.0, versions of which may be used as any one or more of the commands from an RFID reader system component according to embodiments.

FIG. 15A is a table illustrating the fields of the Select command of the Gen2 Spec. Version 1.1.0 of the Gen2 Spec is hereby incorporated by reference in its entirety. The fields of this Select command are explained in more detail in the above mentioned Gen2 Spec. In addition, the implementation of this Select command can have a custom payload so that it operates as the Gush command, the Enable Gush command, the Disable Gush command, the Tune command, and/or another custom command.

Figure 15B:
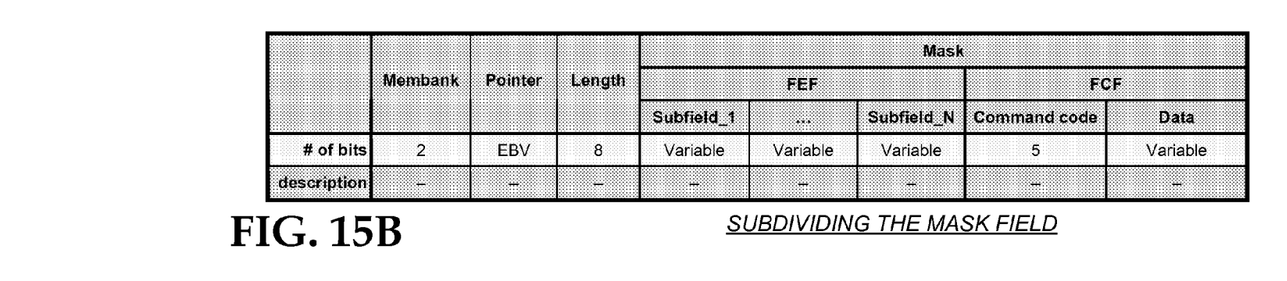
FIG. 15B is a table illustrating how a number of custom commands can be enabled in a reader and a tag.

FIG. 15B is a table illustrating how a number of custom commands can be enabled in a reader and a tag. EBV stands for Extensible Bit Vector. The Mask Field can be partitioned as shown, into two primary subfields, named FEF and FCF.

The Feature Enabling Field (FEF) enables the tag to verify that it is a proper recipient for the command, by comparing the transmitted FEF value against a value in Membank. In this case, Membank can be EPC, TID or USER memory. As can be seen, the FEF can be further partitioned into subfields for better clarity. Such subfields might include, for example if Membank is TID memory as described in Gen2 v1.1.0, a Class Identifier, the MDID, and an Indicator Bit.

The Class Identifier can be two bits. For example, EPCglobal can correspond to a value of 10. This would allow the custom command to apply, for example, only to EPCglobal tags.

The MDID is the tag manufacturer's ID, which is stored in the tag's TID memory. For Impinj tags, this number is 000000000001 or 100000000001. The MDID allows a reader to select tags of only the manufacturer of interest. So, even if this Select command is transmitted and received before singulation, the Select command can select also according to the tag manufacturer's ID. This will cause the manufacturer's tags to be selected, and thus the reader can ensure prior knowledge of the tag manufacturer's identification.

The Indicator Bit can be set to 0 or 1. In the Gen2 spec, a tag model number follows the MDID. A bit of this model number can serve as the Indicator Bit, and can be interpreted as follows: If it is 0, the tags can interpret the command as an "ordinary" Select, and execute it per the Gen2 spec. Else, if it is 1, the tags can interpret the Select command as a custom instruction, and execute according to the FCF.

The Feature Command Field (FCF) can have a command code that indicates the number of the custom instruction. For example, a command code of 00000 could be the Gush command. A 5-bit field permits 32 possible custom commands. A command code of 11111 could indicate an extended command field that extends into the subsequent data field, allowing more than 32 custom commands.

The data field can contain data needed to implement the custom instruction, if any. Not all commands will use it. The data field can be variable in size. Its meaning will derive from the command code. For example, the duration value of the Tune command can be encoded as data in the FCF subfield shown in FIG. 14.

In some embodiments, the tag may ignore the Target and Action field in the Select command, depending on whether these fields are relevant. In other embodiments, the tag may also set the appropriate Target flag.

In preferred embodiments, the entire Select command must be valid for the tag to accept and execute the custom command. That means valid values for Membank, Length, Pointer, Mask, CRC-16, etc. An example is now described.

Figure 15C:
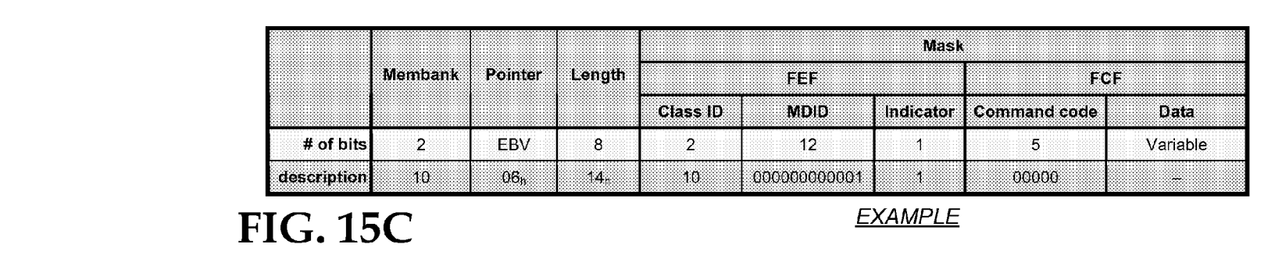
FIG. 15C is a table showing sample values that can be used for the table of FIG. 15B.

FIG. 15C is a table showing sample values that can be used for the table of FIG. 15B. These could be used for a custom Gush command. The Membank having a binary value of 10 point to the TID memory. The pointer having a hex value of 06 h points to the last two bits of the class identifier. The length having a hex value of 14 h points to a length of 20 bits that follow thereafter.

Everything described above in terms of readers and reader components finds some correspondence with tags and tag chips. In some instances, some of the above also describe features and behavior of tag chips.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An operational processing block for a Radio Frequency Identification (RFID) reader to communicate with an RFID tag storing a first code and a second code, and able to backscatter the first code responsive to receiving a first command, comprising: a component for:
   causing a third command to be transmitted to the first tag; and
   receiving, responsive to causing to be transmitted the third command, backscattered from the first tag a combination made from at least portions of the first code and the second code without causing to be transmitted any commands while the combination is being backscattered.

2. The operational processing block of claim 1, in which the first code is an Electronic Product Code (EPC) of the first tag for a host item to which the first tag is attached.

3. The operational processing block of claim 1, in which the first tag is able to backscatter the second code responsive to receiving a second command.

4. The operational processing block of claim 1, in which the second code is a Tag Identifier (TID) code of the first tag that complies with the Gen2 Spec v1.1.0.

5. The operational processing block of claim 1, in which the second code is one of a date of expiration of a host item that the first tag is attached to, a date by which the host item is to be sold by, a date at which the host item was sold, a code for a sale of the host item, a receipt of the sale, an identifier for a retailer that made the sale, an identifier for a store through which the sale is made, an identifier for the first tag, a password for the first tag, and an indicator for how a memory of the first tag is configured.

6. The operational processing block of claim 1, in which the third command is different from the first command.

7. The operational processing block of claim 1, in which a custom Gush command is caused to be transmitted in connection with the transmitted third command, and the backscattered combination is received responsive to causing to be transmitted the custom Gush command and the third command.

8. The operational processing block of claim 7, in which the third command is identical to the first command.

9. The operational processing block of claim 7, in which the combination can be configured in one of at least a first way and a second way, and the combination is configured in the first way or the second way responsive to the custom Gush command.

10. The operational processing block of claim 7, in which the first tag is singulated from a population of tags, and the custom Gush command is caused to be transmitted before the first tag becomes singulated.

11. The operational processing block of claim 10, in which the first command is caused to be transmitted after the first tag becomes singulated.

12. The operational processing block of claim 1, in which the combination includes the entire first code.

13. The operational processing block of claim 1, in which the combination includes the entire second code.

14. The operational processing block of claim 1, in which the combination includes the portion of the first code and the portion of the second code with their bits not intermingled.

15. The operational processing block of claim 14, in which the portion of the first code and the portion of the second code occur contiguously in the combination.

16. The operational processing block of claim 14, in which there is an interim pause having a non-zero duration between the portion of the first code and the portion of the second code in the combination.

17. The operational processing block of claim 16, in which a duration value is decoded from a custom Tune command that is caused to be transmitted, and the duration is determined from the duration value.

18. The operational processing block of claim 17, in which the custom Tune command is the third command.

19. A method for a Radio Frequency Identification (RFID) reader system component to communicate with a first RFID tag storing a first code and a second code, and able to backscatter the first code responsive to receiving a first command, comprising:
    causing a third command to be transmitted to the first tag; and
    receiving, responsive to causing to be transmitted the third command, backscattered from the first tag a combination made from at least portions of the first code and the second code without causing to be transmitted any commands while the combination is being backscattered.

20. The method of claim 19, in which the first tag is able to backscatter the second code responsive to receiving a second command.

21. The method of claim 19, in which the third command is different from the first command.

22. The method of claim 19, in which a custom Gush command is caused to be transmitted in connection with the transmitted third command, and the backscattered combination is received responsive to causing to be transmitted the custom Gush command and the third command.

23. The method of claim 22, in which the combination can be configured in one of at least a first way and a second way, and the combination is configured in the first way or the second way responsive to the custom Gush command.

24. The method of claim 22, in which the first tag is singulated from a population of tags, and the custom Gush command is caused to be transmitted before the first tag becomes singulated.

25. An article comprising: a storage medium, the storage medium having instructions stored thereon, in which when the instructions are executed by at least a Radio Frequency Identification (RFID) reader system component to communicate with a first RFID tag storing a first code and a second code, and able to backscatter the first code responsive to receiving a first command, the instructions result in actions comprising:
    causing a third command to be transmitted to the first tag; and
    receiving, responsive to causing to be transmitted the third command, backscattered from the first tag a combination made from at least portions of the first code and the second code without causing to be transmitted any commands while the combination is being backscattered.

* * * * *